(12) United States Patent
Tetsuka

(10) Patent No.: US 10,479,438 B2
(45) Date of Patent: Nov. 19, 2019

(54) BICYCLE BRAKE AND SHIFT OPERATING DEVICE

(75) Inventor: Toshio Tetsuka, Hyogo (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 13/077,037

(22) Filed: Mar. 31, 2011

(65) Prior Publication Data

US 2012/0247264 A1    Oct. 4, 2012

(51) Int. Cl.
*B62K 23/06*    (2006.01)

(52) U.S. Cl.
CPC ......... *B62K 23/06* (2013.01); *Y10T 74/20474* (2015.01)

(58) Field of Classification Search
USPC ............. 74/473.12, 473.13, 488, 489, 502.2; 188/24.11; 200/61.88
IPC .................................. B62M 25/08; B62L 3/02
See application file for complete search history.

(56) References Cited

U.S. PATENT DOCUMENTS

| | | |
|---|---|---|
| 1,208,427 A | 12/1916 | White |
| 4,065,983 A | 1/1978 | Mimura |
| 4,143,557 A | 3/1979 | Wakebe et al. |
| 4,383,155 A * | 5/1983 | Tenner ................. H01H 23/025 200/292 |
| 4,900,291 A | 2/1990 | Patterson |
| 5,358,451 A | 10/1994 | Lacombe et al. |
| 5,400,675 A | 3/1995 | Nagano |
| 5,470,277 A | 11/1995 | Romano |
| 5,653,649 A | 8/1997 | Watarai |
| 5,678,455 A | 10/1997 | Watarai |
| 5,768,945 A | 6/1998 | Ose |
| 5,941,125 A | 8/1999 | Watarai et al. |
| 6,015,036 A | 1/2000 | Fukuda |
| 6,031,190 A | 2/2000 | Tokuda et al. |
| 6,038,923 A | 3/2000 | Lin |
| 6,073,730 A | 6/2000 | Abe |
| 6,216,078 B1 | 4/2001 | Jinbo et al. |
| 6,227,068 B1 | 5/2001 | Masui et al. |

(Continued)

FOREIGN PATENT DOCUMENTS

| | | |
|---|---|---|
| DE | 196 42 906 A1 | 4/1997 |
| DE | 10 2008 064 514 A1 | 7/2010 |

(Continued)

OTHER PUBLICATIONS

Raymond Henry, Du Vélocipède au Dérailleur Moderne; La suprenante histoire des changements de vitesse; Association des amis du Musée d'industrie de Saint-Étienne; Apr. 2003, Achevé d'imprimer, No. 7948; Les presses de l'Imprimerie Chirat, Saint-Just-La-Pendue, France.

(Continued)

*Primary Examiner* — Thomas C Diaz
(74) *Attorney, Agent, or Firm* — Global IP Counselors, LLP

(57) ABSTRACT

A bicycle brake and shift operating device is basically provided with a base member, a brake lever and a first shift switch. The base member includes a grip portion and a mounting portion. The mounting portion is configured to be mounted to a bicycle handlebar. The brake lever is pivotally connected to the base member at a pivot axis. The brake lever includes an inward facing surface and an outward facing surface. The first shift switch includes a first operating portion arranged along the inward facing surface of the brake lever. The first shift switch is arranged to electrically control a shifting device.

15 Claims, 9 Drawing Sheets

(56) References Cited

U.S. PATENT DOCUMENTS

| | | |
|---|---|---|
| 6,467,786 B2 | 10/2002 | Horiuchi |
| 6,546,827 B2 | 4/2003 | Irie |
| 6,698,307 B2 | 3/2004 | Wesling et al. |
| 6,698,567 B2 | 3/2004 | Dal Pra' |
| 6,941,834 B2 | 9/2005 | Irie |
| 6,991,081 B2 | 1/2006 | Uno et al. |
| 7,007,785 B2 | 3/2006 | Uno et al. |
| 7,080,723 B2 | 7/2006 | Uno et al. |
| 7,350,436 B2 * | 4/2008 | Fujii ............ 74/473.13 |
| 7,712,566 B2 | 5/2010 | Jordan et al. |
| 7,854,180 B2 | 12/2010 | Tetsuka |
| 2001/0053724 A1 | 12/2001 | Campagnolo |
| 2003/0019712 A1 | 4/2003 | Wesling et al. |
| 2003/0074997 A1 | 4/2003 | Wesling et al. |
| 2007/0193387 A1* | 8/2007 | Nakano .......... B62K 23/02 74/501.6 |
| 2008/0087131 A1* | 4/2008 | Tetsuka .......... 74/502.2 |
| 2008/0168856 A1* | 7/2008 | Tetsuka .......... 74/502.2 |
| 2008/0210043 A1 | 9/2008 | De Perini |
| 2009/0031841 A1* | 2/2009 | Tetsuka .......... B62K 23/06 74/473.12 |

FOREIGN PATENT DOCUMENTS

| | | |
|---|---|---|
| EP | 1 225 123 A1 | 7/2002 |
| EP | 1 375 325 A2 | 1/2004 |
| EP | 1 473 220 A1 | 11/2004 |
| EP | 1 526 069 A2 | 4/2005 |
| EP | 1 932-754 A2 | 6/2008 |
| ER | 1 384 659 A2 | 1/2004 |
| FR | 2 654 698 A1 | 5/1991 |
| JP | 60-85297 U | 6/1985 |
| TW | 340102 U | 9/1998 |
| TW | M370562 U | 12/2009 |

OTHER PUBLICATIONS

Mavic; Brochure; ZMS 800—Shift system; 1995.
European Search Report of corresponding EP Application No. 11 19 3631.6 dated Mar. 4, 2012.

* cited by examiner

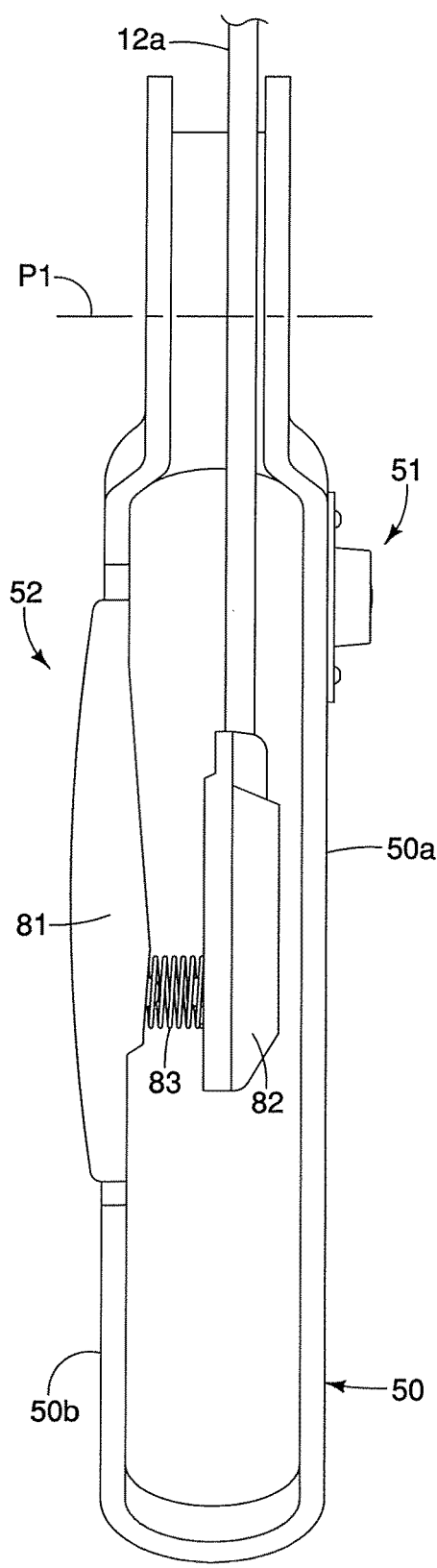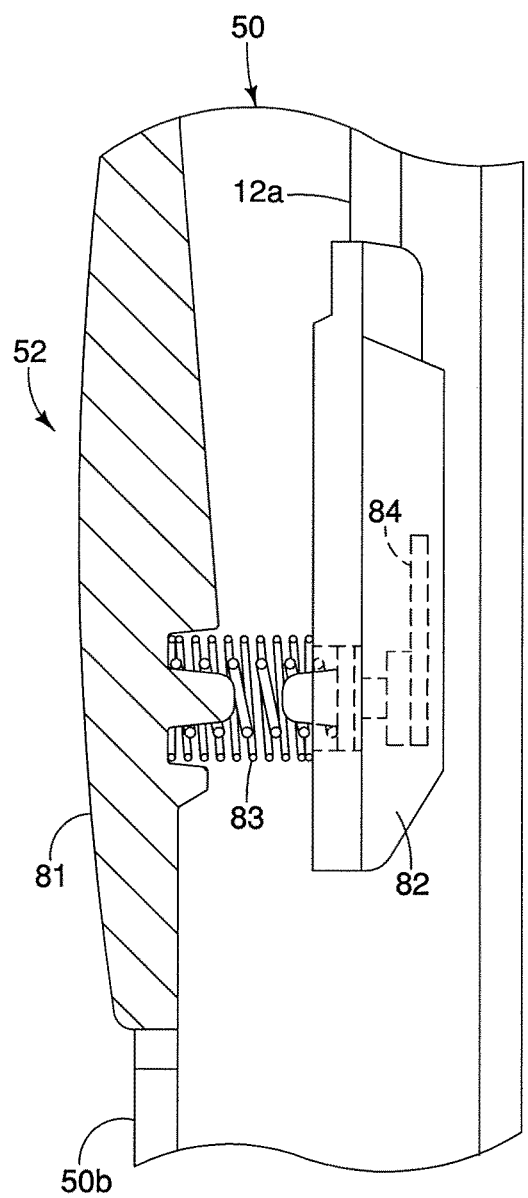
FIG. 10
FIG. 11

BICYCLE BRAKE AND SHIFT OPERATING DEVICE

BACKGROUND

Field of the Invention

This invention generally relates to a bicycle brake and shift operating device. More specifically, the present invention relates to a bicycle brake and shift operating device that is mounted to a handlebar of a bicycle for operating a braking device and for electrically operating a gear changer apparatus.

Background Information

There are known bicycle gear changing devices (also called gear shifting devices) that are electric powered and configured such that they can be controlled electrically so as to change among a plurality of gear positions. This kind of electric-powered gear changing device is operated with a shift operating device that can be mounted to a brake bracket or a brake lever of a brake operating device (e.g., U.S. Pat. No. 7,854,180). This conventional shift operating device electrically operates a gear changing device such as a front derailleur and a rear derailleur. Similarly to cable-type shift operating devices, a shift operating device is arranged on the right side of the handlebar for the rear derailleur and a shift operating device is arranged on the left side of the handlebar for the front derailleur. Each shift operating device has a gear shift switch having a lever member that pivots both in an outward direction and an inward (toward the center) direction of the handlebar from an operation start position. The indexing position changes by one position in the upshift direction when the lever member is pivoted in one direction and one position in the downshift direction when the lever member is pivoted in the other direction.

SUMMARY

One aspect is to provide is to provide a bicycle brake and shift operating device for operating an electric-powered gear changing device that enables a rider to easily perform gear shift operations.

In view of the state of the known technology, a bicycle brake and shift operating device is provided that basically comprises a base member, a brake lever and a first shift switch. The base member includes a grip portion and a mounting portion. The mounting portion is configured to be mounted to a bicycle handlebar. The brake lever is pivotally connected to the base member at a pivot axis. The brake lever includes an inward facing surface and an outward facing surface. The first shift switch includes a first operating portion arranged along the inward facing surface of the brake lever. The first shift switch is arranged to electrically control a shifting device.

These and other objects, features, aspects and advantages of the present invention will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure:

FIG. 10 is an enlarged partial perspective view of the lever operating part of the brake lever and the second shift switch that is mounted to arranged along the outward facing surface of the lever operating part of the brake lever;

FIG. 11 is a further enlarged rear elevational view of the lever operating part of the brake lever and the second shift switch with a portion of the second shift switch shown in cross section;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
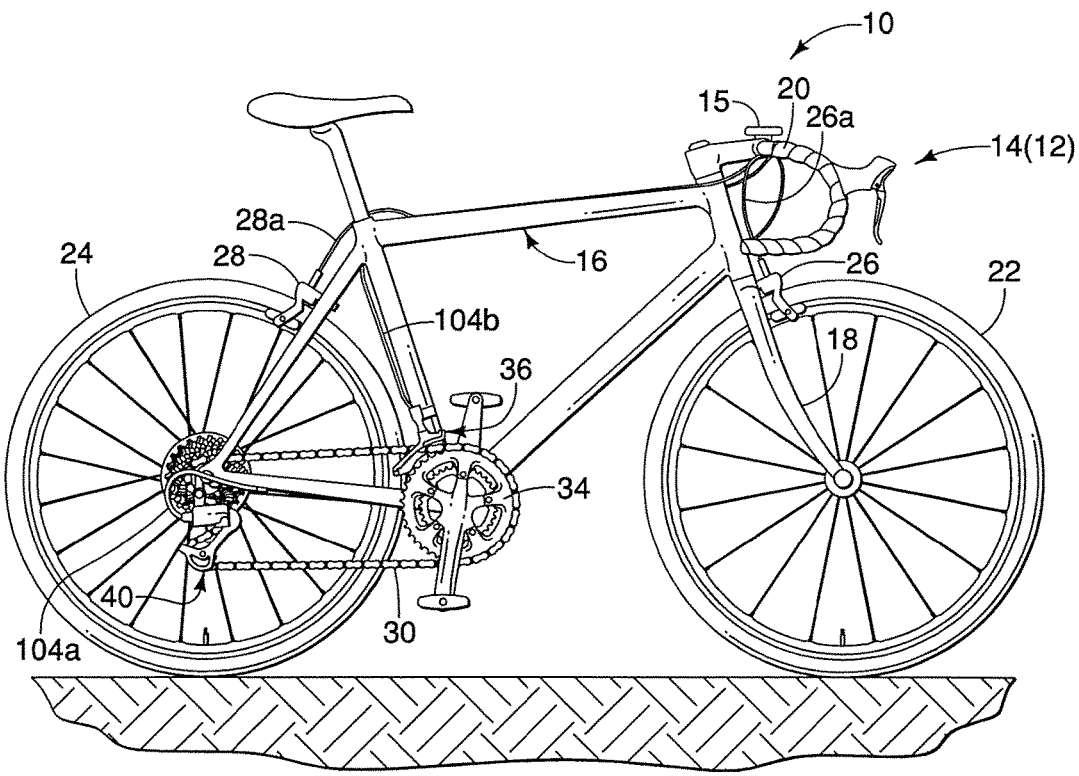
FIG. 1 is a side elevational view of a bicycle equipped with a pair of bicycle brake and shift operating devices in accordance with one illustrated embodiment.
Figure 2:
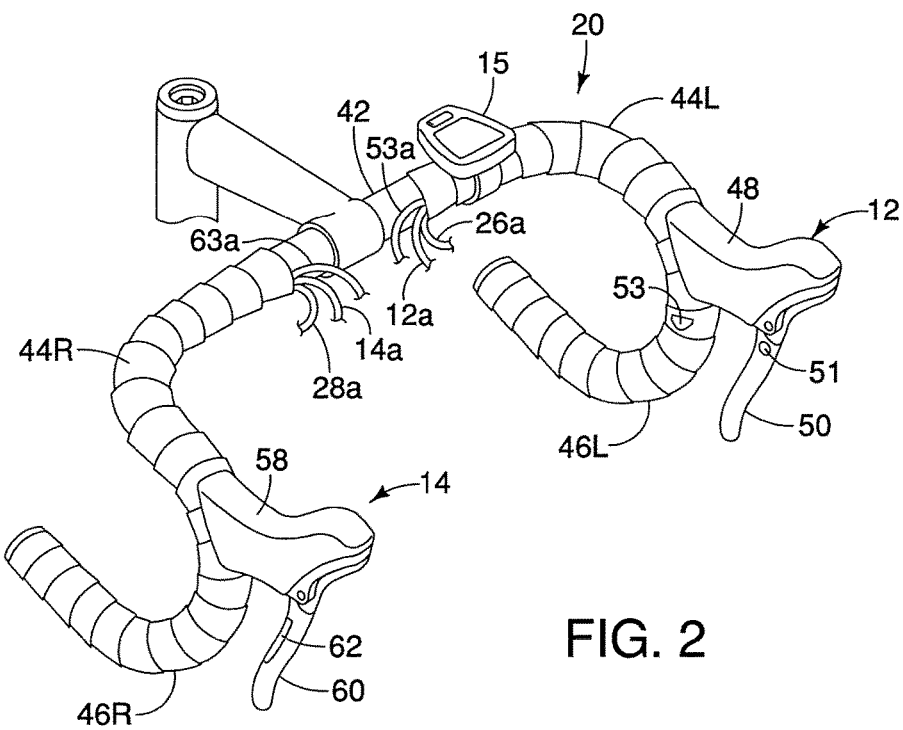
FIG. 2 is an enlarged perspective view of the handlebar equipped with the bicycle brake and shift operating devices.

Referring initially to FIGS. 1 and 2, a bicycle 10 is illustrated that is equipped with a first bicycle brake and shift operating device 12 and a second bicycle brake and shift operating device 14 in accordance with one illustrated embodiment. A display unit 15 is provided for displaying gear positions, speed, traveled distance and other information to the rider. The display unit 15 can be a cycle computer with a microprocessor as needed and/or desired.

The bicycle 10 is a "road racer" (racing style road bike). The bicycle 10 basically includes a diamond-shaped frame 16, a front fork 18, a handlebar 20, a front wheel 22, a rear wheel 24. The front fork 18 is rotatably mounted to the head tube of the frame 16 in a conventional manner. The handlebar 20 is fastened to the front fork 18 in a conventional manner for turning the front wheel 22. The front wheel 22 is rotatably mounted to the lower end of the front fork 18 in a conventional manner. The rear wheel 24 is rotatably mounted to the rear end of the frame 16 in a conventional manner. A front brake 26 is mounted to the front fork 18. A rear brake 28 is mounted to the frame 16.

The brake and shift operating devices 12 and 14 are connected to the front and rear brakes 26 and 28, respectively, with Bowden-type brake cables 26a and 28a. The brake and shift operating devices 12 and 14 are also provided with shift signal lines 12a and 14a, respectively, for output shift signals or commands to control the front and rear shifting devices 36 and 40, respectively, as explained below.

As seen in FIG. 1, the bicycle 10 further includes a chain 30, a front crank assembly 32, a plurality of front sprockets 34, a front shifting device 36 (e.g., a motorized front derailleur), a plurality of rear sprockets 38 and a rear shifting device 40 (e.g., a motorized rear derailleur). These components basically form a drive train of the bicycle 10. The front sprockets 34 are mounted to the front crank assembly 32 such that the front crank assembly 32 rotates the front sprockets 34 in response to a pedaling action by a rider in a conventional manner. The rear sprockets 38 are mounted to a rear hub of the rear wheel 24 to rotate therewith. The chain 30 is disposed on one the front sprockets 34 and one of the rear sprockets 38, with the front and rear shifting devices 36 and 40 arranged to shift the chain 30 between the front sprockets 34 and the rear sprockets 38, respectively. In particular, the front shifting device 36 is operated by the first and second bicycle brake and shift operating devices 12 and 14. The rear shifting device 40 is operated by the first and second bicycle brake and shift operating devices 12 and 14. However, the first and second bicycle brake and shift operating devices 12 and 14 are not limited to use with this type of drive train with front and rear derailleurs as the gear shifting devices. Rather the first and second bicycle brake and shift operating devices 12 and 14 can be used to operate other types of gear shifting devices (also called gear changing devices). For example, the first and second bicycle brake and shift operating devices 12 and 14 can be used to operate an internal shifting hub and/or an internal shifting device as needed and/or desired.

Figure 3:
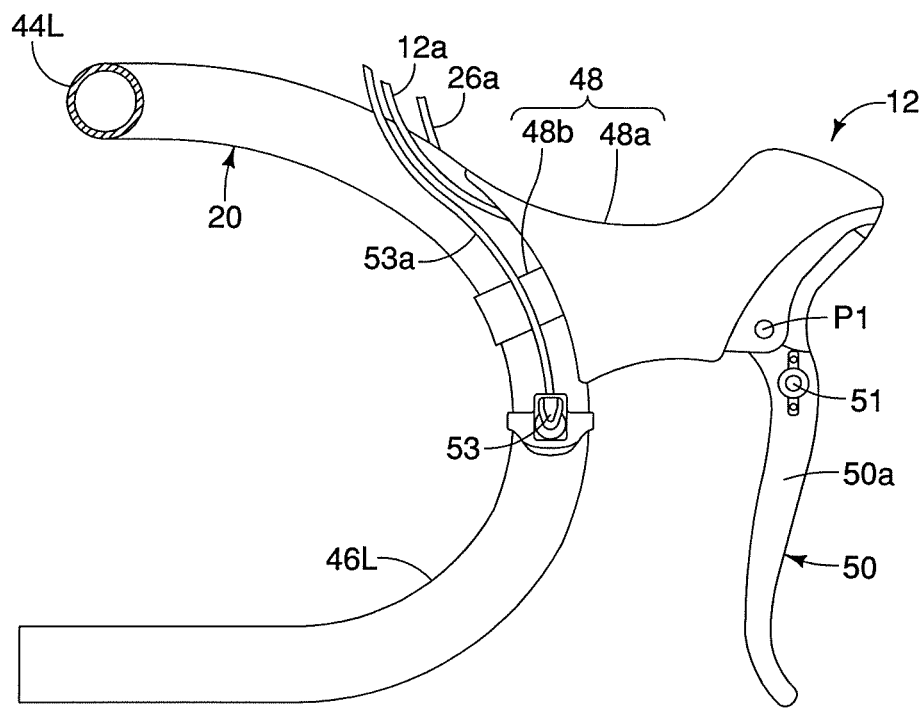
FIG. 3 is an enlarged inside elevational view of the bicycle brake and shift operating device for operating the front brake and for downshifting the front and rear shifting devices (.e.g., the derailleurs in FIG. 1) of the bicycle.
Figure 4:
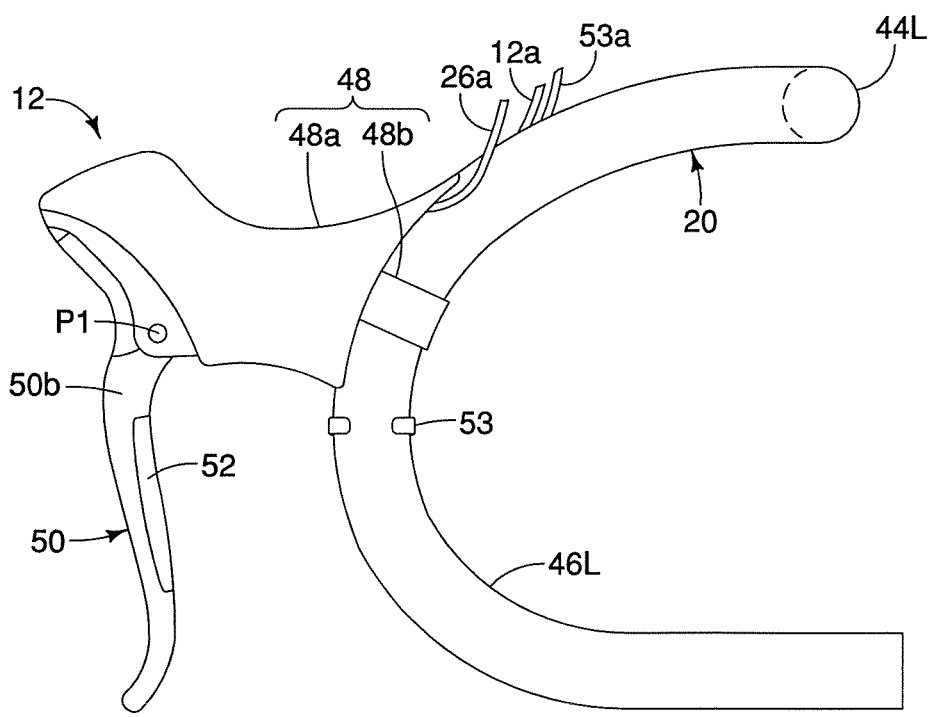
FIG. 4 is an enlarged outside elevational view of the bicycle brake and shift operating device for operating the front brake and for downshifting the front and rear shifting devices (.e.g., the derailleurs in FIG. 1) of the bicycle.

As seen in FIG. 2, the handlebar 20 is a drop-type handlebar that includes a main body portion 42, a first shoulder portion 44L, a second shoulder portion 44R, a first U-shaped curved portion 46L and a second U-shaped curved portion 46R. The first shoulder portion 44L interconnects a first end of the main body portion 42 to the first U-shaped curved portion 46L. The second shoulder portion 44R interconnects a second end of the main body portion 42 to the second U-shaped curved portion 46R. Thus, the first shoulder portion 44L and the first U-shaped curved portion 46L are disposed on a first lateral side of the main body portion 42, while the second shoulder portion 44R and the second U-shaped curved portion 46R are disposed on a second lateral side of the main body portion 42. Basically, the handlebar main body portion 42 forms a central portion of the handlebar 20, while the U-shaped curved portions 46L and 46R forms first and second end portions of the handlebar 20, respectively. The curved portions 46L and 46R are arranged such that the curved portions thereof protrude in the forward direction from the shoulder portions 44L and 44R, respectively. The brake and shift operating devices 12 and 14 are mounted on the handlebar 20. The first bicycle brake and shift operating device 12 is arranged on the left-hand end of the handlebar 20 when the bicycle 10 is viewed from the rear and looking forward. The second bicycle brake and shift operating device 14 is arranged on the right-hand end when the bicycle 10 is viewed from the rear and looking forward. As shown in FIGS. 2 through 4, the handlebar 20 together with the brake and shift operating devices 12 and 14 constitute a handlebar assembly.

As best seen in FIGS. 3 and 4, the first bicycle brake and shift operating device 12 basically includes a first base member 48, a first brake lever 50, a first shift switch 51, a second shift switch 52 and a third shift switch 53. As discussed below, the first and third shift switches 51 and 53 face toward the inside or inward side (i.e., "inside" and "inward side" indicates the direction toward the center of the handlebar 20) of the handlebar 20, while the second shift switch 52 is mounted to a rearward facing part of the first brake lever 50, but operated from an outside or outward side (i.e., "outside" and "outward side" indicates the direction away from the center of the handlebar 20). The first and second shift switches 51 and 52 are connected to the shift signal line 12a. The third shift switch 53 is connected to a shift signal line 53a for output shift signals or commands to control the rear shifting device 40 as explained below.

The first bicycle brake and shift operating device 12 is mounted to the first U-shaped curved portion 46L (first end portion) of the handlebar 20 by the base member 48. The first brake lever 50 is operatively coupled to the front brake 26. The first and third shift switches 51 and 53 are arranged to electrically control a downshift operation of the rear shifting device 40. In other words, the first and third shift switches 51 and 53 operate the rear shifting device 40 to selectively perform a downshift operation of the rear shifting device 40. On the other hand, the second shift switch 52 is arranged to electrically control a downshift operation of the front shifting device 36. In other words, the second shift switch 52 operates the front shifting device 36 to selectively perform downshift operation of the front shifting device 36. Thus, the switches 51, 52 and 53 of the first bicycle brake and shift operating device 12 all perform only downshift operations.

As seen in FIGS. 3 and 4, the first base member 48 includes a grip portion 48a and a mounting portion 48b. The grip portion 48a pivotally supports the first brake lever 50 at the end of the grip portion 48a that is opposite the mounting portion 48b. In particular, the first brake lever 50 is pivotally connected to the grip portion 48a at a pivot axis P1 so as to pull an inner wire of the brake cable 26a relative to the outer case of the brake cable 26a for operating the front brake 26. The mounting portion 48b is configured to be mounted to the first U-shaped curved portion 46L (first end portion) of the handlebar 20. Preferably, the mounting portion 48b is a band type clamp with a tightening bolt disposed in the grip portion 48a that is typically used on road style shifters for dropdown handlebars as shown.

Figure 5:
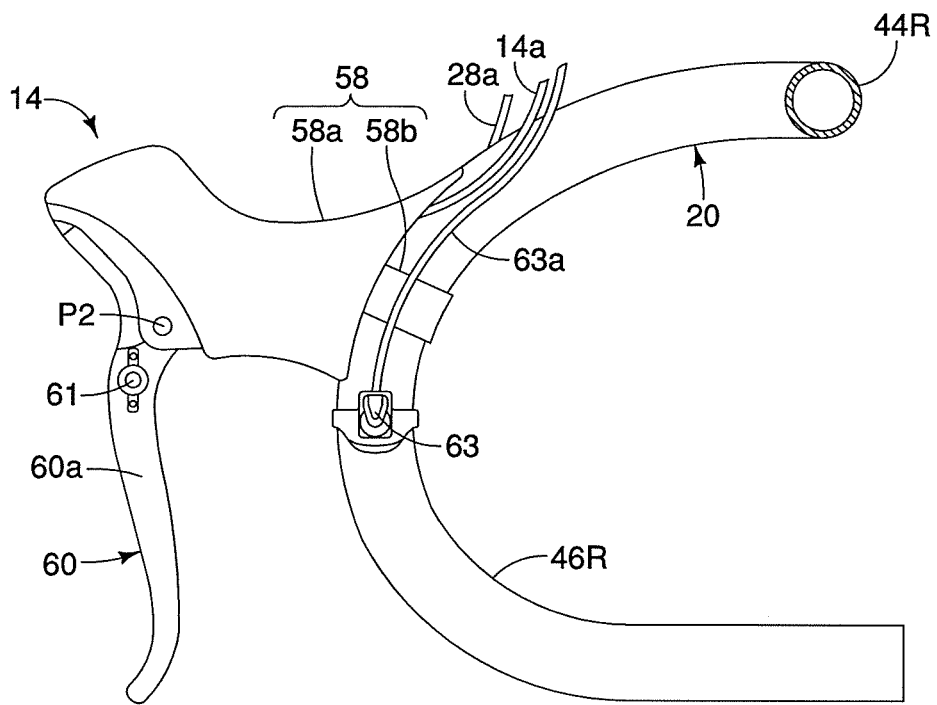
FIG. 5 is an enlarged inside elevational view of the bicycle brake and shift operating device for operating the rear brake and for upshifting the front and rear shifting devices (.e.g., the derailleurs in FIG. 1) of the bicycle.
Figure 6:
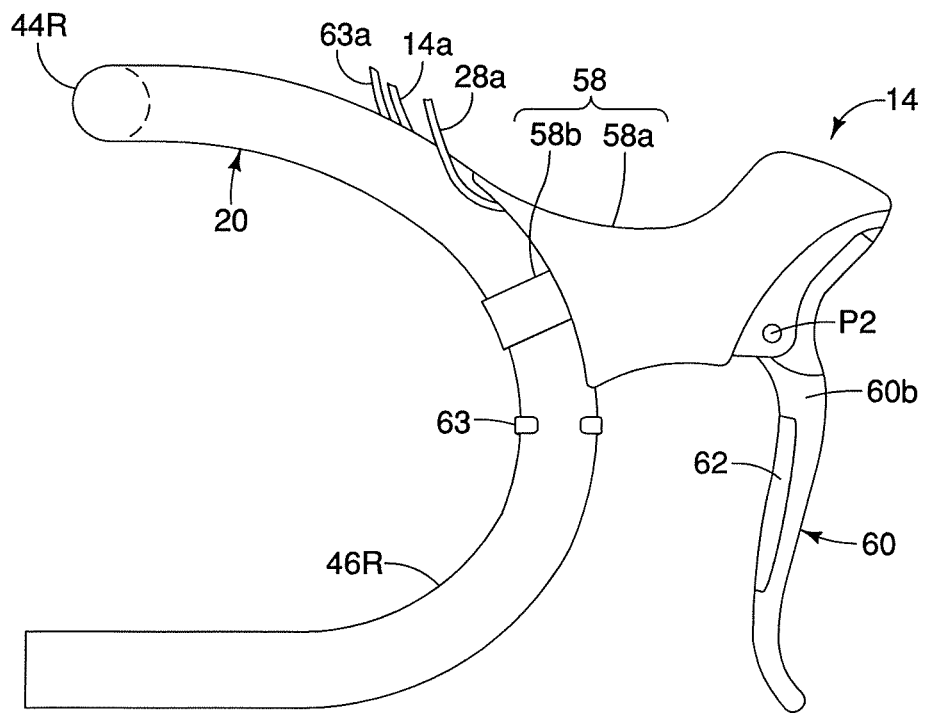
FIG. 6 is an enlarged outside elevational view of the bicycle brake and shift operating device for operating the rear brake and for upshifting the front and rear shifting devices (.e.g., the derailleurs in FIG. 1) of the bicycle.

As best seen in FIGS. 5 and 6, the second bicycle brake and shift operating device 14 basically includes a second base member 58, a second brake lever 60, a first shift switch 61, a second shift switch 62 and a third shift switch 63. The second bicycle brake and shift operating device 14 is mounted to the second U-shaped curved portion 46L (second end portion) of the handlebar 20 by the base member 58. The second brake lever 60 is operatively coupled to the rear brake 28. The first and third shift switches 61 and 63 are arranged to electrically control an upshift operation of the rear shifting device 40. In other words, the first and third shift switches 61 and 63 operate the rear shifting device 40 to selectively perform an upshift operation of the rear shifting device 40. On the other hand, the second shift switch 62 is arranged to electrically control an upshift operation of the front shifting device 36. In other words, the second shift switch 62 operates the front shifting device 36 to selectively perform an upshift operation of the front shifting device 36. Thus, the switches 61, 62 and 63 of the second bicycle brake and shift operating device 14 all perform only upshift operations. As discussed below, the first and third shift switches 61 and 63 face toward the inside or inward side (i.e., "inside" and "inward side" indicates the direction toward the center of the handlebar 20 of the handlebar 20, while the second shift switch 62 is mounted to a rearward facing part of the second brake lever 60, but operated from an outside or outward side (i.e., "outside" and "outward side" indicates the direction away from the center of the handlebar 20). The first and second shift switches 61 and 62 are connected to the shift signal line 14a. The third shift switch 53 is connected to a shift signal line 63a for output shift signals or commands to control the rear shifting device 40 as explained below.

As seen in FIGS. 5 and 6, the second base member 58 includes a grip portion 58a and a mounting portion 58b. The grip portion 58a pivotally supports the second brake lever 60 at the end of the grip portion 58a that is opposite the mounting portion 58b. In particular, the second brake lever 60 is pivotally connected to the grip portion 58a at a pivot axis P2 so as to pull an inner wire of the brake cable 28a relative to the outer case of the brake cable 28a for operating the rear brake 28. The mounting portion 58b is configured to be mounted to the first U-shaped curved portion 46R (second end portion) of the handlebar 20. Preferably, the mounting portion 58b is a band type clamp with a tightening bolt disposed in the grip portion 58a that is typically used on road style shifters for drop-down handlebars as shown.

As best seen in FIGS. 5 and 6, the second bicycle brake and shift operating device 14 is a mirror image of the first bicycle brake and shift operating device 12. Thus, the structures and arrangements of the shift switches 61, 62 and 63 are the same as the structures and arrangements of the shift switches 51, 52 and 53, except for being mirror images and their connections to the front and rear shifting devices 36 and 40 as discussed above. Accordingly, the structures and arrangements of the shift switches 51, 52 and 53 shown in FIGS. 9 to 13 applies to the shift switches 61, 62 and 63, except for being mirror images thereof.

Figure 7:
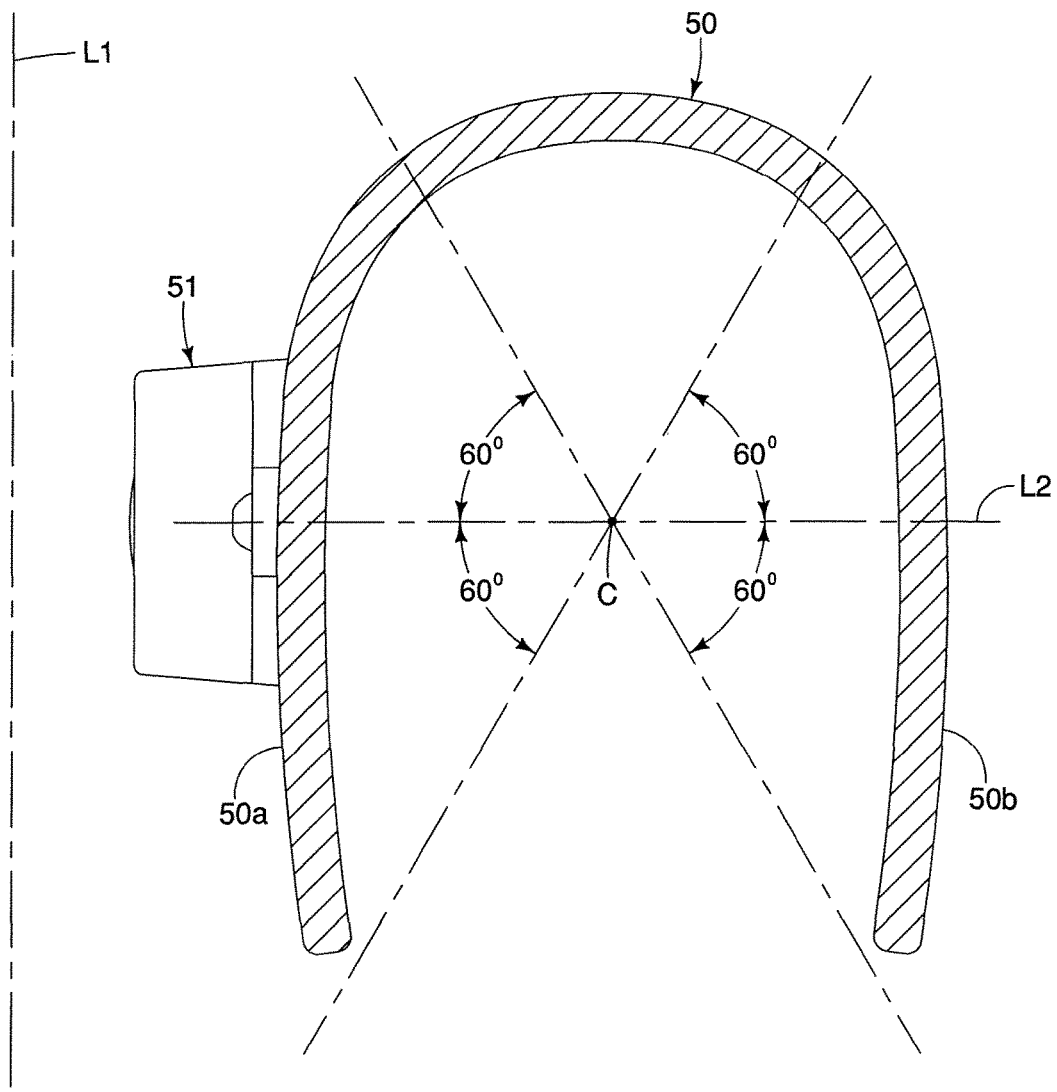
FIG. 7 is an enlarged horizontal cross section of the lever operating part of the brake lever just above the first shift switch.

As seen in FIG. 7, the first brake lever 50 includes an inward facing surface 50a and an outward facing surface 50b. The second brake lever 60 is a mirror image of the first brake lever 50, and has an inward facing surface 60a (FIG. 5) and an outward facing surface 60b (FIG. 6). Thus, the following description of the first brake lever 50 applies to the second brake lever 60. Typically, the inward and outward facing surfaces 50a and 50b are curved surfaces as seen in FIG. 7. Thus, the term inward facing surface as used herein refers to a surface area of a brake lever that faces towards a center vertical longitudinal plane L1 of the bicycle and lies horizontally within sixty degrees in each direction of a vertical lateral plane L2 that is perpendicular to the center vertical longitudinal plane L1 of the bicycle, and that passes through the centroid C (i.e., the geometric center) of the two directional cross section of the brake lever. Similarly, the term outward facing surface as used herein refers to a surface area of a brake lever that faces away from the center vertical longitudinal plane L1 of the bicycle and lies horizontally within sixty degrees in each direction of the vertical lateral plane L2 that is perpendicular to the center vertical longitudinal plane L1 of the bicycle, and that passes through the centroid C (i.e., the geometric center) of the two directional cross section of the brake lever.

Figure 8:
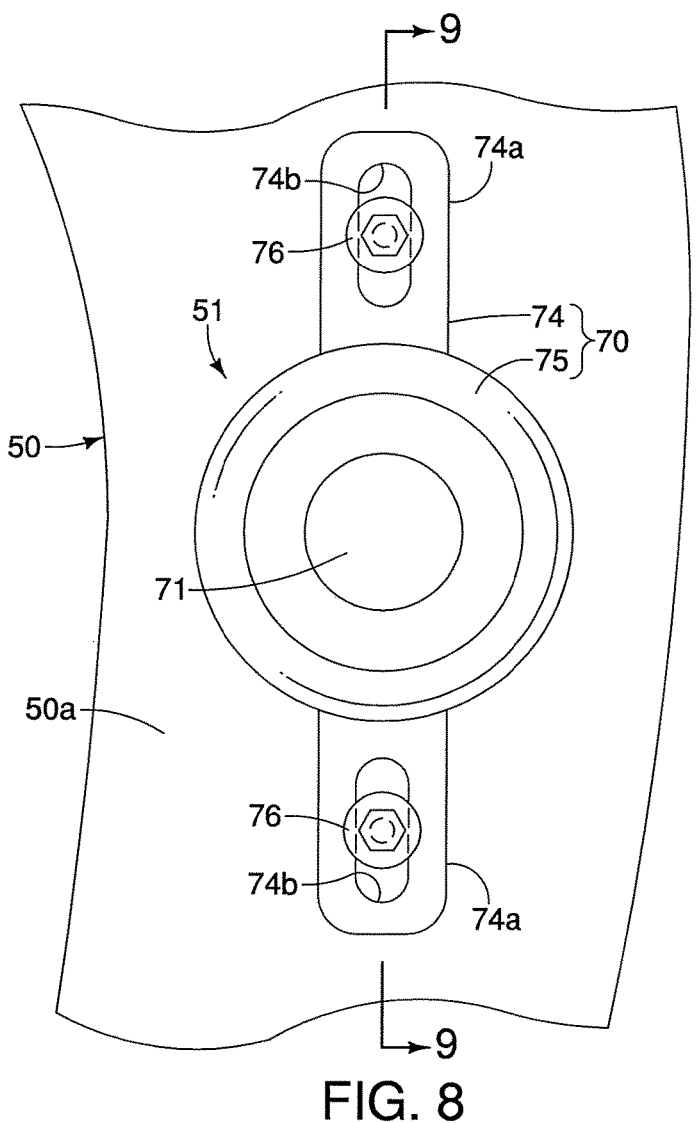
FIG. 8 is an enlarged partial elevational view of the first shift switch that is mounted to arranged along the inward facing surface of the lever operating part of the brake lever.
Figure 9:
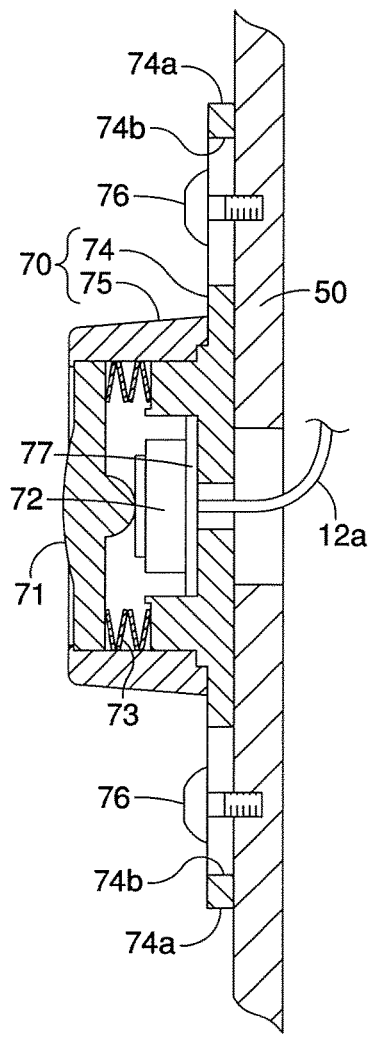
FIG. 9 is an enlarged cross sectional view of the first shift switch and the lever operating part of the brake lever as seen along section line 9-9 of FIG. 8.

As seen in FIGS. 8 and 9, the first shift switch 51 is a pushbutton-type switch that includes an attachment member 70, a pushbutton-type operating portion 71, a switching portion 72 and a biasing member 73. The attachment member 70 is fastened to the first brake lever 50 such that the operating portion 71 is arranged along the inward facing surface 50a of the first brake lever 50. The operating portion 71 is movably mounted on the attachment member 70 so that the operating portion 71 can be pushed towards the switching portion 72 against the force of the biasing member 73. The switching portion 72 is, for example, a tactile switch which is pushed by the operating portion 71. The switching portion 72 can be constructed as a switch that is either ordinarily closed or ordinarily opening as needed and/or desired. The switching portion 72 includes a printed circuit board 77.

In this illustrated embodiment, the attachment member 70 includes a base member 74 which has two attachment flanges 74a, and a case member 75 which is fastened to the base member 74. The base member 74 has two attachment flanges 74a for attaching to the inward facing surface 50a of the first brake lever 50. The operating portion 71 has a disk shape in which a central part protrudes slightly from the case member 75. The biasing member 73 (e.g., four dish springs) are mounted between the operating portion 71 and the base member 74. As a result, the operating portion 71 is held in non operated position.

Each of the attachment flanges 74a has a slot 74b for receiving a fastener 76 therethrough. The fastener 76 is threaded into a threaded hole of the inward facing surface 50a of the first brake lever 50. Thus, the operating portion 71 of the first shift switch 51 is adjustably arranged relative to the brake lever 50 such that a location of the operating portion 71 of the first shift switch 51 relative to the brake lever 50 is selectively changed between at least two different locations along the inward facing surface 50a of the brake lever 50. The first shift switch 51 can be adjusted in both a longitudinal direction of the slots 74b and a transverse direction of the slots 74b. For example, preferably, the operating portion 71 is adjustable within a range of about three millimeters to ten millimeters. The location of the operating portion 71 of the first shift switch 51, which is used for shifting, can be disposed in accordance with the size of the rider's hand or the preferences of the rider. The operating portion 71 of the first shift switch 51 is arranged adjacent the pivot axis P1 of the brake lever 50. Preferably, the center of the operating portion 71 of the first shift switch 51 is within at least thirty millimeters of the pivot axis P1 of the brake lever 50.

As seen in FIGS. 10 and 11, the second shift switch 52 is a pushbutton-type switch that includes a pushbutton-type operating portion 81, a switching portion 82 and a biasing member 83. The operating portion 81 is arranged along a rearward facing surface of the brake lever 50. In particular, the switching portion 82 is fastened to the rearward side of the first brake lever 50 with the operating portion 81 projecting through a cutout in the outward facing surface 50b of the first brake lever 50. The operating portion 81 is movably mounted to a housing of the switching portion 82 so that the operating portion 81 can be pushed towards the switching portion 82 against the force of the biasing member 83. The switching portion 82 is, for example, a tactile switch which is pushed by the operating portion 81. The switching portion 82 can be constructed as a switch that is either ordinarily closed or ordinarily opening as needed and/or desired. The switching portion 82 includes a printed circuit board 84.

Figure 12:
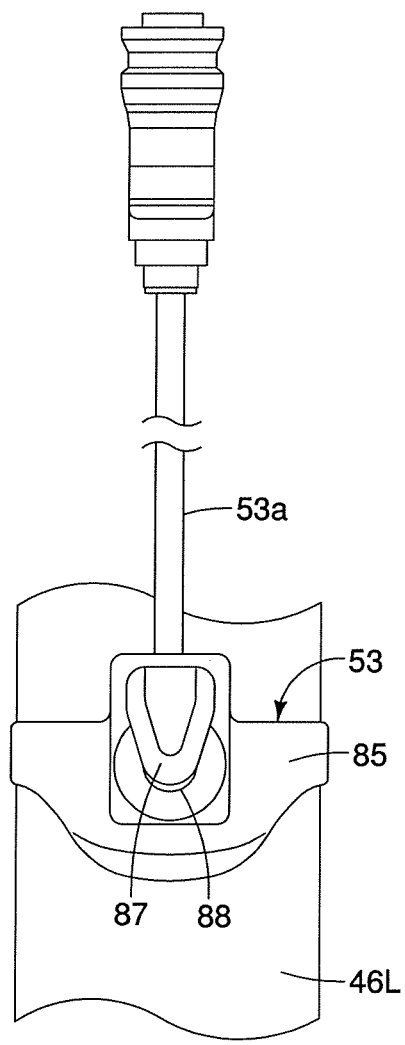
FIG. 12 is an enlarged partial elevational view of the handlebar and the third shift switch that is mounted to arranged along the inward facing surface of the handlebar.
Figure 13:
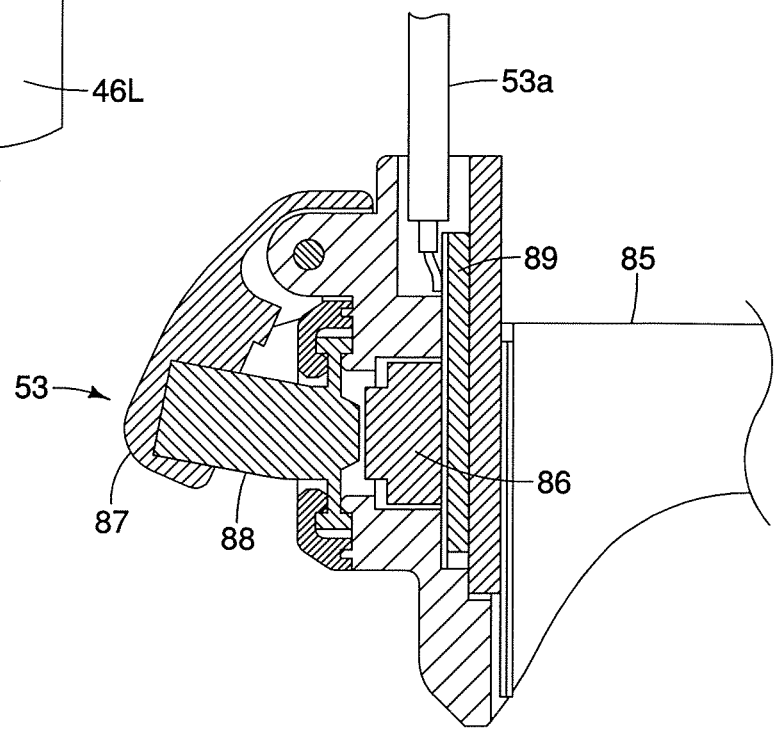
FIG. 13 is an enlarged cross sectional view of the third shift switch as seen along section line 13-13 of FIG. 12.

As seen in FIGS. 12 and 13, the third shift switch 53 is a pushbutton-type switch that includes a handlebar mounting portion 85, a switching portion 86, a pushbutton-type operating portion 87 and a biasing member 88. The third shift switch 53 is mounted to the first U-shaped curved portion 46L of the handlebar 20 by the handlebar mounting portion 85 so that the operating portion 87 faces in an inside or inward direction. The operating portion 87 is pivotally mounted to the handlebar mounting portion 85 so that the operating portion 87 can be pushed towards the switching portion 86 against the force of the biasing member 88. The switching portion 86 is, for example, a tactile switch which is pushed by the operating portion 87. The switching portion 86 can be constructed as a switch that is either ordinarily closed or ordinarily opening as needed and/or desired. The switching portion 86 includes a printed circuit board 89.

Figure 14:
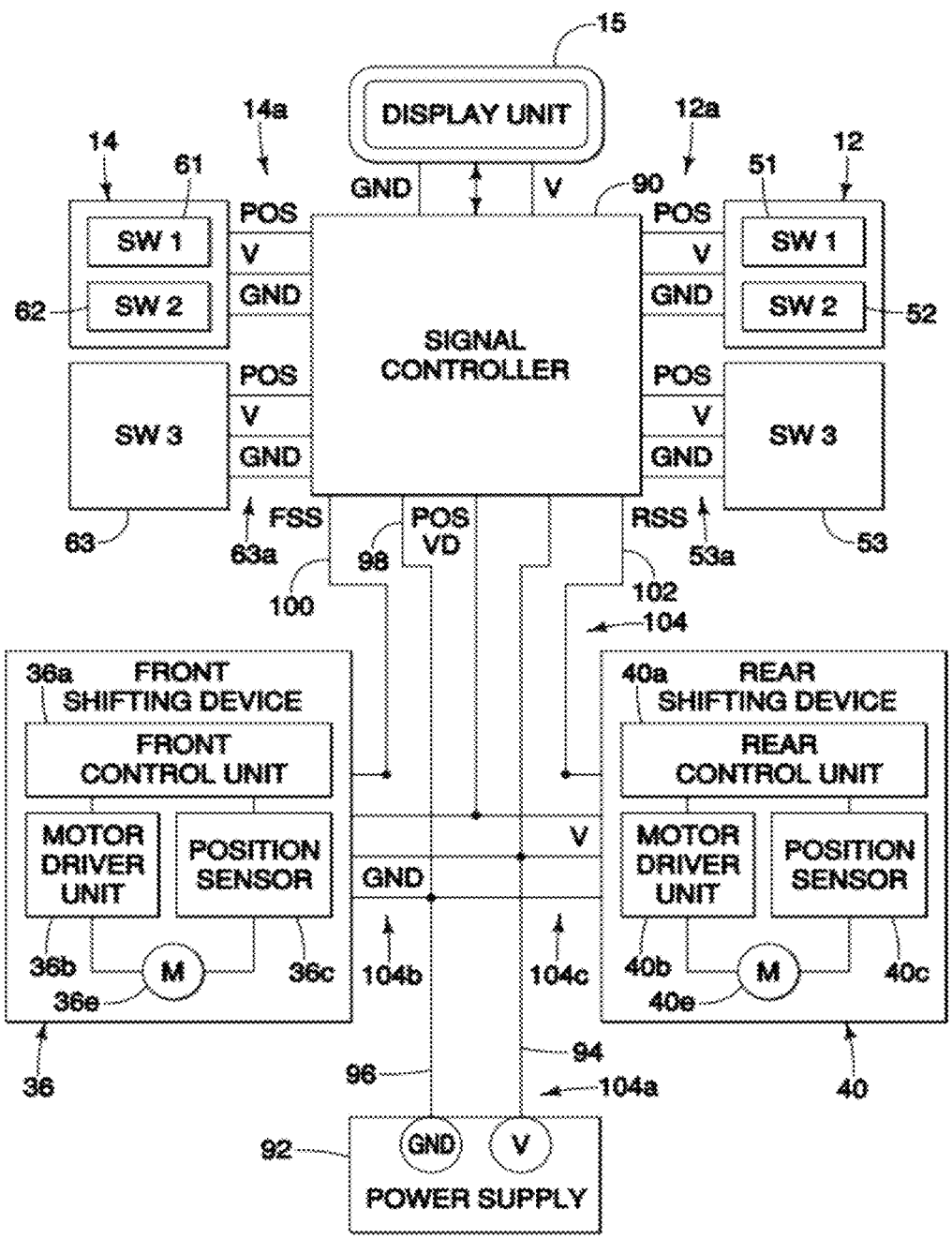
FIG. 14 is a schematic block diagram showing the entire configuration of the bicycle gear changing control system.

As seen in FIG. 14, a schematic block diagram showing the entire configuration of the bicycle gear changing control system is illustrated. A signal controller 90 is provided for communicating shift input signals from the shift switches 51, 52, 53, 61, 62 and 63 to the front and rear shifting devices 36 and 40 (e.g., derailleurs, internal shifting devices or internal shifting hubs). The shift switches 51, 52 and 53 are connected to the signal controller 90 by the shift signal lines 12a and 53a. The shift switches 61, 62 and 63 are connected to the signal controller 90 by the shift signal lines 14a and 63a.

Also the bicycle gear changing control system is provided with a power supply device 92 for supplying power to the display unit 15, the front and rear shifting devices 36 and 40, the shift switches 51, 52, 53, 61, 62 and 63, and the signal controller 90. Specifically, a power supply voltage V is supplied by the power supply device 92 via a power supply line 94 and a grounding wire 96 as discussed below.

As seen in FIG. 14, the front shifting device 36 includes a front control unit 36a (FD controller), a motor drive unit 36b, a position sensor 36c and a motor 36e. The front control unit 36a is configured and arranged to control the motor drive unit 36b in response to a shift control signal from one of the second shift switches 52 and 62. The motor 36e is configured and arranged to drive the front shifting device 36. The motor drive unit 36b is configured and arranged to drive the motor 36e. The position sensor 36c is configured and arranged to control sense the gearshift position of the front shifting device 36. The front control unit 36a, the motor drive unit 36b and/or a position sensor 36c form the front actuating unit.

As seen in FIG. 14, the rear shifting device 40 includes a rear control unit 40a (RD controller), a motor drive unit 40b, a position sensor 40c and a motor 40e. The rear control unit 40a is configured and arranged to control the motor drive unit 40b in response to a shift control signal from one of the first and third shift switches 51, 53, 61 and 63. The motor 40e is configured and arranged to drive the rear shifting device 40. The motor drive unit 40b is configured and arranged to drive the motor 40e. The position sensor 40c is configured and arranged to control sense the gearshift position of the rear shifting device 40. The rear control unit 40a, the motor drive unit 40b and/or a position sensor 40c form the rear actuating unit.

Still referring to FIG. 14, the gearshift position signals POS of the front and rear position sensors 36c and 40c are output to the signal controller 90 via a position signal line 98. In the signal controller 90, these signals are converted into display signals so that the gearshift positions of the front and rear shifting devices 36 and 40 are displayed by the display unit 15. Voltage data (VD: e.g., three stages of voltage data) is also output to the position signal line 98. Furthermore, the gearshift signals FSS and RSS that are output in accordance with the operation of the shift switches 51, 52, 53, 61, 62 and 63 are output to the front and rear shifting devices 36 and 40 via respective gearshift signal lines 100 and 102. These signal lines 98, 100, 102 are part of a wiring harness 104 that includes the power supply line 94 and the grounding wire 96. The wiring harness 104 has a main trunk 104a running from the power supply device 92 to the signal controller 90. The wiring harness 104 also has a first branch 104b connecting the front shifting device 36 to the main trunk 104a, and a second branch 104c connecting the rear shifting device 40 to the main trunk 104a.

Figure 15:
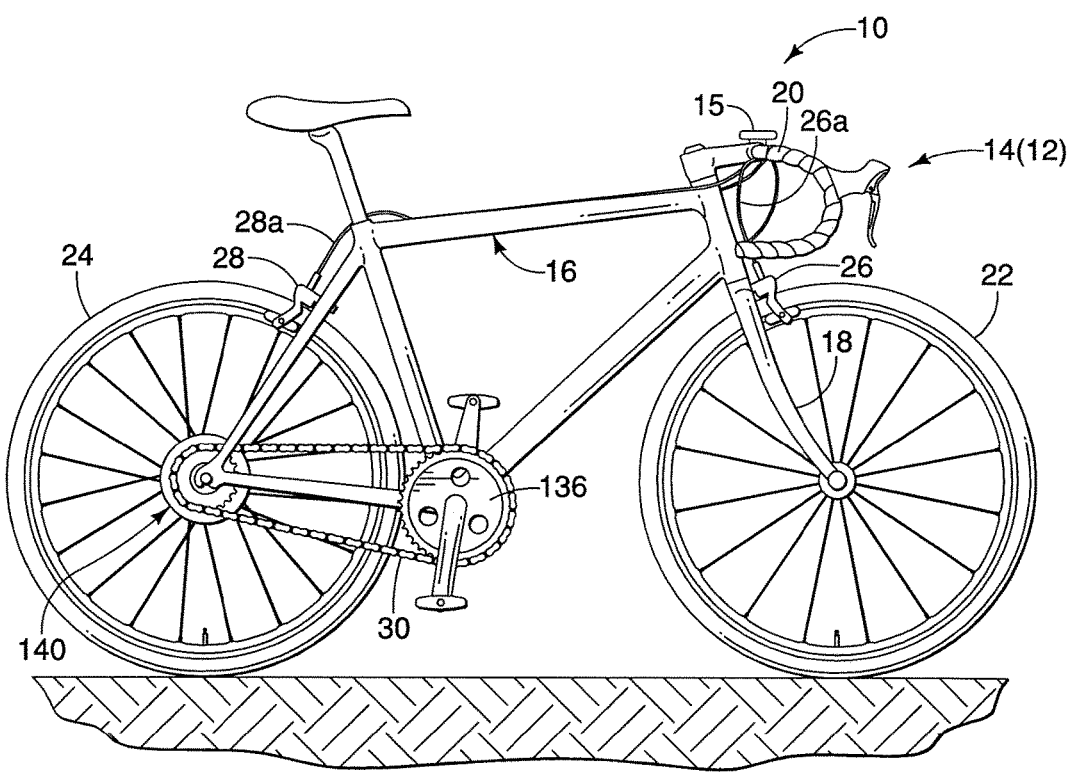
FIG. 15 is a side elevational view of another bicycle equipped with the bicycle brake and shift operating devices in accordance with the illustrated embodiment.

Referring now to FIG. 15, the front shifting device 36 (e.g., the motorized front derailleur, and the rear shifting device 40 (e.g., a motorized rear derailleur) of the bicycle 10 has been replaced with an internal shifting device 136 and an internal shifting hub 140. Since internal shifting devices and internal shifting hubs are well known types of shifting devices, the internal shifting device 136 and the internal shifting hub 140 will not be discussed and illustrated in further detail. The bicycle brake and shift operating devices 12 and 14 operate the internal shifting device 136 and the internal shifting hub 140 in the same manner as the front and rear shifting devices 36 and 40 as discussed above. Thus, for the purpose of control by the bicycle brake and shift operating devices 12 and 14, the basic constructions of the internal shifting device 136 and the internal shifting hub 140 are the same as the front and rear shifting devices 36 and 40, respectively, as seen in FIG. 14. Of course, the actual shifting mechanisms of the internal shifting device 136 and the internal shifting hub 140 are different from the front and rear shifting devices 36 and 40, respectively.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, when such directional terms as "vertical" and "horizontal," "upper" and "lower," "longitudinal" and "transverse," "inward" and "outward," "front" and "rear," and "left" and "right" are used regarding a part, they refer to said directions as they apply to the part when the part is installed on a bicycle that is situated on level ground in a normal riding position. The terms "left" and "right" refer to the left and right sides or left and right directions of the bicycle when the bicycle is viewed from the rear. Accordingly, these directional terms, as utilized to describe the present invention should be interpreted relative to a bicycle equipped with the control devices of the present invention as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle brake and shift operating device comprising:
   a base member including a grip portion and a mounting portion being configured to be mounted to a bicycle handlebar;
   a brake lever pivotally connected to the base member at a pivot axis, the brake lever including an inward facing surface and an outward facing surface, the inward facing surface facing toward a center plane which perpendicularly extends from a center portion of the bicycle handlebar with respect to a longitudinal direction of the bicycle handlebar when the base member is mounted on the bicycle handlebar;
   a first shift switch including a slot and a first operating portion mounted on the inward facing surface of the brake lever, the first shift switch being arranged to electrically control a shifting device, the first operating portion being adjustably arranged in upward and downward directions transverse to an opening direction of the slot in a state where the bicycle brake and shift operating device is mounted to the bicycle handlebar; and
   a second shift switch at least partially disposed on the outward facing surface of the brake lever, the second shift switch arranged to electrically control one of the shifting device and an additional shifting device, the second shift switch includes an operating portion at least partially disposed on an outward facing surface of the brake lever, a switching portion disposed completely within the brake lever and coupled to a rearward side of the brake lever, the operating portion being movably mounted to a housing of the switching portion.

2. The bicycle brake and shift operating device claim 1, further comprising
   a third shift switch including a third operating portion configured to be mounted to the bicycle handlebar and being arranged to electrically control one of the shifting device and the additional shifting device.

3. The bicycle brake and shift operating device according to claim 2, wherein
   the third shift switch is disposed downward of the mounting portion and rearward of the brake lever.

4. The bicycle brake and shift operating device according to claim 1, wherein
   the first shift switch operates a derailleur as the shifting device.

5. The bicycle brake and shift operating device according to claim 2, wherein
   the first shift switch operates one of a rear derailleur and a front derailleur as the shifting device, the second shift switch operates other of the rear derailleur and the front derailleur as the additional shifting device, and the third shift switch operates either the rear derailleur or the front derailleur.

6. The bicycle brake and shift operating device according to claim 5, wherein
   the first and third shift switches respectively operate the rear derailleur to selectively perform a downshift operation of the rear derailleur, and
   the second shift switch operates the front derailleur to selectively perform a downshift operation of the front derailleur.

7. The bicycle brake and shift operating device according to claim 5, wherein
   the first and third shift switches respectively operate the rear derailleur to selectively perform an upshift operation of the rear derailleur,
   the second shift switch operates the front derailleur to selectively perform an upshift operation of the front derailleur.

8. The bicycle brake and shift operating device according to claim 1, wherein
   the first shift switch operates an internal shifting device as the shifting device.

9. The bicycle brake and shift operating device according to claim 1, wherein
   the first shift switch operates an internal shifting hub as the shifting device.

10. The bicycle brake and shift operating device according to claim 1, wherein
    the first operating portion is adjustably arranged relative to the brake lever such that a location of the first operating portion relative to the brake lever is selectively changed between at least two different locations along the inward facing surface of the brake lever.

11. The bicycle brake and shift operating device according to claim 1, wherein
    the first operating portion is arranged adjacent the pivot axis of the brake lever.

12. A bicycle handlebar assembly comprising:
    a handlebar including a central portion, a first end portion on a first lateral side of the central portion and a second end portion on a second lateral side of the central portion;
    a first bicycle brake and shift operating device including a first base member that is attached to the first end portion of the handlebar and a first brake lever that is pivotally connected to the first base member at a first pivot axis, the first bicycle brake and shift operating device further including
    a first shift switch including a slot and a first operating portion arranged along an inward facing surface of the first brake lever and arranged to electrically control a first shifting device, the inward facing surface of the first brake lever facing toward a center plane which perpendicularly extends from a center portion of the handlebar with respect to a longitudinal direction of the handlebar, the first operating portion being adjustably arranged in upward and downward directions transverse to an opening direction of the slot in a state where the bicycle brake and shift operating device is mounted to the bicycle handlebar, a second shift switch including a second operating portion arranged along an outward facing surface of the first brake lever and arranged to electrically control one of the first shifting device and a second shifting device, a switching portion disposed completely within the brake lever and coupled to a rearward side of the brake lever, the operating portion being movably mounted to a housing of the switching portion, and a third shift switch including a third operating portion arranged along the handlebar and arranged to electrically control one of the first and second shifting devices; and a second bicycle brake and shift operating device including a second base member that is attached to the second end portion of the handlebar and a second brake lever that is pivotally connected to the second base member at a second pivot axis, the second bicycle brake and shift operating device further including a first shift switch including a first operating portion arranged along an inward facing surface of the second brake lever and arranged to electrically control the second shifting device, the inward facing surface of the second brake lever facing toward the center plane which perpendicularly extends from the center portion of the handlebar with respect to the longitudinal direction of the handlebar, a second shift switch including a second operating portion arranged along an outward facing surface of the second brake lever and arranged to electrically control one of the first and second shifting devices, a switching portion disposed completely within the brake lever and coupled to a rearward side of the brake lever, the operating portion being movably mounted to a housing of the switching portion, and a third shift switch including a third operating portion arranged along the handlebar and arranged to electrically control one of the first and second shifting devices.

13. The bicycle handlebar assembly according to 12, wherein the first and third shift switches of the first bicycle brake and shift operating device operate the first shifting device to selectively perform an upshift operation of the first shifting device, the second shift switch of the first bicycle brake and shift operating device operates the second shifting device to selectively perform an upshift operation of the second shifting device, the first and third shift switches of the second bicycle brake and shift operating device operate the first shifting device to selectively perform a downshift operation of the first shifting device, and the second shift switch of the second bicycle brake and shift operating device operates the second shifting device to selectively perform a downshift operation of the second shifting device.

14. The bicycle brake and shift operating device according to claim 1, wherein the first operating portion is adjustably arranged in upward and downward directions in a state where the bicycle brake and shift operating device is mounted to the bicycle handlebar.

15. The bicycle brake and shift operating device according to claim 1, wherein the second shift switch includes a second operating portion disposed in a cutout on the outward facing surface of the brake lever.

* * * * *